United States Patent [19]

Gradeff et al.

[11] 3,917,713

[45] *Nov. 4, 1975

[54] PROCESS FOR PREPARING HYDROXY CITRONELLAL

[75] Inventors: Peter S. Gradeff, Andover; Claude Bertrand, Somerset, both of N.J.

[73] Assignee: Rhodia, Inc., New York, N.Y.

[ * ] Notice: The portion of the term of this patent subsequent to Mar. 4, 1992, has been disclaimed.

[22] Filed: Apr. 28, 1971

[21] Appl. No.: 138,358

[52] U.S. Cl. ............... 260/602; 260/494; 260/491
[51] Int. Cl.² ......................................... C07C 47/26
[58] Field of Search......... 260/602, 494, 617 R, 641

[56] References Cited
UNITED STATES PATENTS

| | | | |
|---|---|---|---|
| 1,790,523 | 1/1931 | Davies et al. ...................... | 260/639 |
| 2,725,387 | 11/1955 | Thompson .......................... | 260/602 |
| 2,812,355 | 11/1957 | Fox ................................... | 260/602 |
| 2,874,183 | 2/1959 | Isler et al. ........................ | 260/601 R |
| 3,352,930 | 11/1967 | Mention et al. .................... | 260/641 |

FOREIGN PATENTS OR APPLICATIONS 691,825    5/1953   United Kingdom................. 260/494

OTHER PUBLICATIONS

Verley, A., Bull. Soc. Chem., Vol. 43, pp. 845–854, 1928.

Jiri et al., Chemical Abstracts, Vol. 61, Column 3267, 1964.

Isoshima, T., Chemical Abstracts, Vol. 51, Column 6538, 1957.

Clark, G. N., Modern Organic Chem., pp. 41–42, 1964.

Groggins, Unit Processes in Organic Chemistry, 4th Edit., pp. 616–619, 1952.

*Primary Examiner*—Bernard Helfin
*Assistant Examiner*—R. H. Liles

[57] ABSTRACT

A process is provided for the preparation of hydroxy citronellal starting from citronellal, by way of citronellyl enol ester or citronelly diester. The citronellyl enol ester or diester is prepared by acylation of citronellal, using an organic acid anhydride. The hydration of the enol ester or citronellyl diester is carried out using aqueous 58 to 78% sulfuric acid, and the hydroxy enol ester and hydroxy diester are alcoholysed by a lower aliphatic alcohol such as methanol in the presence of a base.

34 Claims, No Drawings

PROCESS FOR PREPARING HYDROXY CITRONELLAL

Hydroxy citronellal is a valuable perfume or fragrance widely used in soap and cosmetic perfumery. Paul Z. Bedonkian, Perfumery and Flavoring Synthetics, Second Edition, 1967, page 182, refers to it as "an indispensable ingredient in most perfume compositions".

Hydroxy citronellal is usually prepared by hydration of the bisulfite compound of citronellal, using aqueous from 40 to 60% sulfuric acid solution at from −5° to 0°C. for from 5 to 12 hours. The hydroxylated bisulfite compound of citronellal is then decomposed to form hydroxy citronellal, while the byproducts of the reaction are separated by extraction with solvent. This method has however many drawbacks, which make it unsuitable for large scale manufacture.

U.S. Pat. No. 3,060,237, dated Oct. 23, 1962, and British Pat. No. 923,901, dated Apr. 18, 1963, and U.S. Pat. No. 2,902,495, dated Sept. 1, 1959, suggest the preparation of hydroxy citronellal starting with pinene. U.S. Pat. No. 3,028,431, dated Apr. 3, 1962, suggests 7,8-epoxy -2, 6-dimethyl 2-octanol as a starting material. However, citronellal is still the most attractive raw material, since it is available in quantity as a main component of citronella oil, as well as other volatile oils, such as lemon oil lemon grass oil, and melissa oil. It can also be made in quantitative yield from citral by hydrogenation.

Verley, Bull. soc. chim. France 43 850 (1928), suggests the hydration of the enol acetate of citronellal, and the decomposition of the resulting hydroxy citronellyl enol acetate, using weak alkali. No experimental details or examples of weak bases or alkali are given, and neither are reaction conditions. The weak bases are generally considered to be ammonium hydroxide and weakly alkaline salts thereof, such as ammonium salts. Such materials we have found to give either no reaction or quite low yields which are not satisfactory for an economical commercial process.

In accordance with the invention, a process is provided for the preparation of hydroxy citronellal (3,7-dimethyl-7-hydroxy-octanal), starting with citronellal and proceeding by way of the enol ester or diester of citronellal, which is hydrated and then alcoholized to form hydroxy citronellal.

The hydration reaction features the use of aqueous 58 to 78% sulfuric acid at a temperature within the range from about −20° to about +50°C.

The alcoholysis reaction features the use of a base in the presence of a lower aliphatic alcohol, resulting in the formation of hydroxy citronellal and the corresponding ester of the alcohol. Reaction proceeds at temperatures ranging from about room temperature or lower and up to reflux temperature, and the hydroxy citronellal is obtained in good yield, in a high state of purity.

The term "base" as used herein is inclusive of any alkaline compound of an alkali metal or alkaline earth metal with an inorganic anion, including both hydroxides and oxides as well as alkaline salts, and certain ion exchange resins.

The three reactions that are combined in the process of the invention to form an overall synthesis of hydroxy citronellal are as follows:

(1) (a)

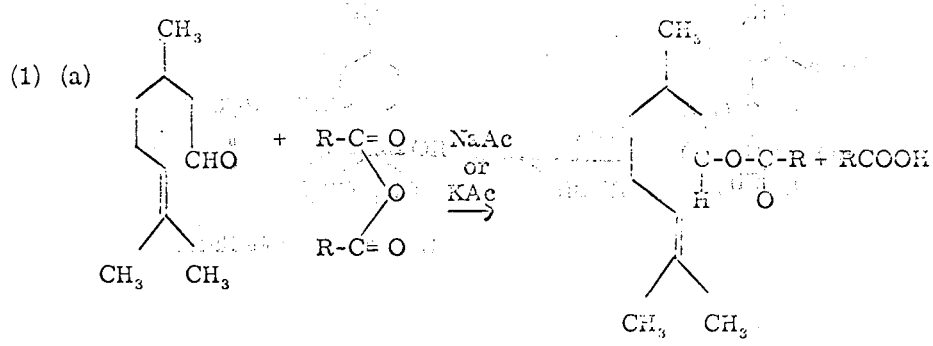

Citronellyl enol ester (b)

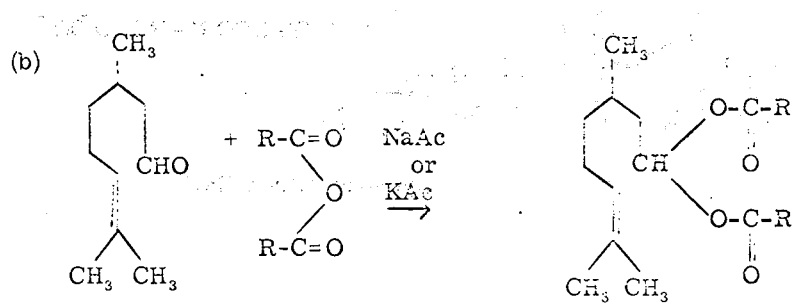

Citronellyl diester (2) (a) 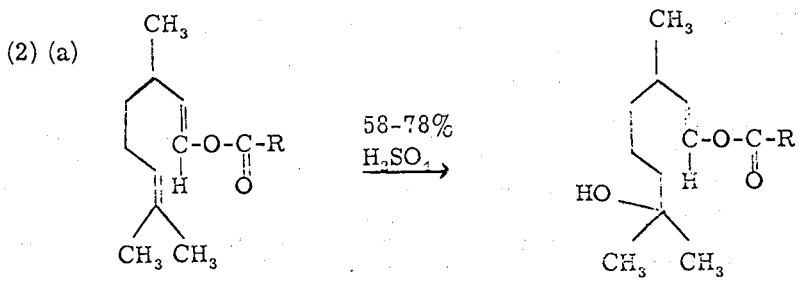
Hydroxy citronellyl enol ester
(b) 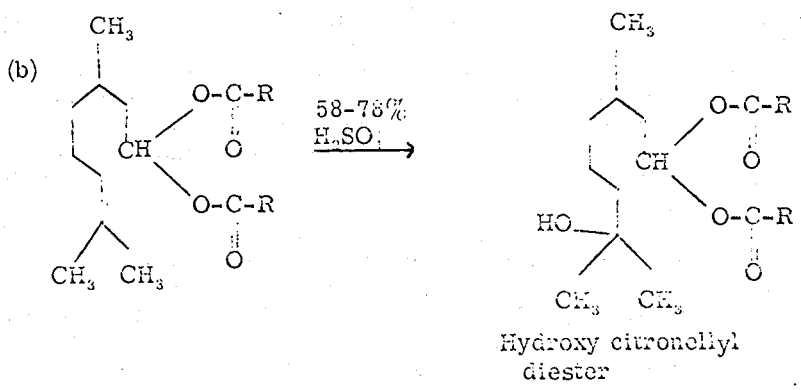
Hydroxy citronellyl diester
(3) (a) 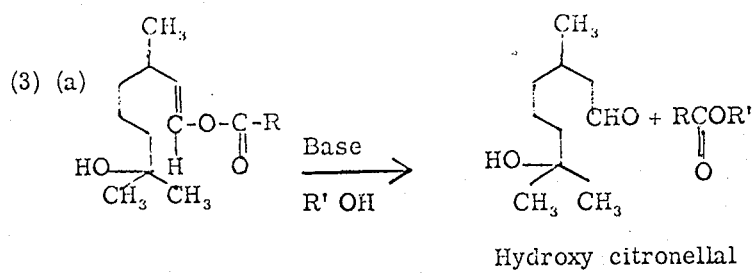
Hydroxy citronellal
(b) 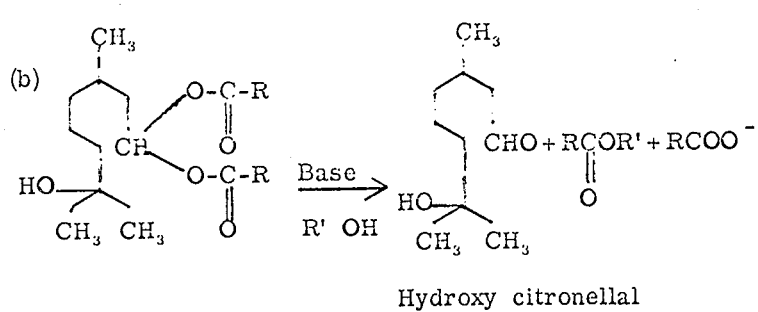
Hydroxy citronellal
In the above formulae, R represents a lower aliphatic radical of a lower aliphatic acid anhydride, such as acetic anhydride (which is preferred) or of a lower aliphatic acid, such as acetic acid (which is preferred). R' represents the aliphatic radical of a lower aliphatic alcohol, such as methyl alcohol (which is preferred).

The first reaction, preparation of the citronellyl enol ester or diester, is a known reaction. The lower aliphatic acid anhydride and citronellal are heated under reflux in the presence of an alkali metal salt of a lower aliphatic carboxylic acid, such as sodium or potassium acetate, propionate, butyrate or valerate. Any lower aliphatic acid anhydride having up to five carbon atoms can be employed, such as acetic anhydride, propionic anhydride, butyric anhydride, isobutyric anhydride, and valeric anhydride. An excess of the acid anhydride is employed, ranging from 1½ to 7 times the stoichiometric amount. The reaction product can be citronellyl enol ester, diester, or a mixture of both, in any proportion, according to the amount of acid anhydride present. Although the diester leads to the same final product as the enol ester, it is more economical to work with the enol ester. Therefore, it is preferred to proceed via the enol ester.

The amount of alkali metal organic acid salt, such as potassium acetate or sodium acetate, required is usually in the order of from about 10 to about 30%.

The reaction proceeds with formation of equimolar amounts of the free acid of the acid anhydride used when the monoester is formed, and this is separated by distillation, preferably continuously, as it is formed, since the presence of free acid seems to favor increased formation of diester and also provoke cyclization of citronellal and/or the enol ester into isopulegol ester, which is not a desirable product and consequently lowers the yield. For this reason, a reaction carried out under reflux of the reaction system is convenient, since the acid can be removed from the distillate (which is then returned) in the course of the reaction. At the conclusion of the reaction, the reaction mixture is fractionated, and the citronellyl enol ester and/or diester is obtained.

The purpose of the esterification is to protect the aldehyde group of the citronellal during the hydration reaction, which is carried out using aqueous sulfuric acid having a concentration within the range from about 58 to about 78% sulfuric acid, preferably 60% to 70% sulfuric acid. The sulfuric acid concentration is critical. A more dilute solution is relatively ineffective, and a more concentrated solution tends to produce undesirable by-products, which may include polymers or cyclized products.

The hydration reaction can be carried out at a temperature within the range having about −20° to about +50°C. The reaction is usually complete in from about 2 hours at the lower temperature to a few minutes at the higher temperatures.

The reaction can be carried out batchwise or continuously. Due to the high heat of reaction, a continuous process is preferable in a large scale operation. In the continuous process, the enol ester and the sulfuric acid are blended and run continuously into the reactor at a relatively low temperature, such as room temperature. The flow rate through the reactor is established to provide a residence time in the reactor corresponding to the desired reaction time, usually a few minutes, depending on the preferred reaction temperature, reactor characteristics, reactants, and acid concentration.

In batch reactions, it is usually preferable, although not essential, to add the enol ester or diester to the sulfuric acid solution at the desired reaction temperature, since the sulfuric acid solution is in the greater volume. The enol ester or diester can be added rather rapidly, over a period of about 15 minutes, after which the reaction temperature is maintained until hydration is complete. The reaction mixture is then worked up and the reaction product distilled.

The alcoholysis of the hydroxy enol ester or diester to hydroxy citronellal proceeds in the presence of a lower aliphatic alcohol and a base, such as an alkali metal or alkaline earth metal hydroxide, carbonate, bicarbonate, or organic acid salt, as an alkaline catalyst. Exemplary inorganic bases are the alkali metal hydroxides, such as sodium hydroxide, potassium hydroxide, or lithium hydroxide, or the alkaline earth metal hydroxides, such as calcium hydroxide, barium hydroxide, or strontium hydroxide, the bicarbonates of the alkali metals, such as sodium bicarbonate, potassium bicarbonate, and lithium bicarbonate, and the carbonates of the alkali and alkaline earth metals, such as sodium carbonate, potassium carbonate, lithium carbonate, calcium carbonate, barium carbonate, and strontium carbonate.

Exemplary organic bases are the alkali metal and alkaline earth metal salts of aliphatic, aromatic, and cycloaliphatic acids, alcohols, and mercaptans, as well as phenols, such as sodium, lithium and potassium acetate; sodium, lithium and potassium propionate; sodium, lithium and potassium butyrate; sodium, lithium and potassium isobutyrate; sodium, lithium and potassium stearate; sodium, lithium and potassium laurate; sodium, lithium and potassium myristate; sodium, lithium and potassium palmitate; sodium lithium and potassium oleate; sodium, lithium and potassium benzoate; sodium, lithium and potassium salicylate; sodium, lithium and potassium phthalate, sodium, lithium and potassium tartrate; sodium, lithium and potassium succinate; sodium, lithium and potasssium maleate; sodium, lithium and potassium adipate; sodium, lithium and potassium lactate; sodium, lithium and potassium citrate; sodium, lithium and potassium malate; sodium, lithium and potassium cyclohexanoate; sodium, lithium and potassium thioglycollate; sodium, lithium and potassium thiomalate; sodium, lithium and potassium methylate; sodium, lithium and potassium ethylate; sodium, lithium and potassium propylate; sodium, lithium and potassium butylate; sodium, lithium and potassium phenolate; sodium, lithium and potassium cresylate. Basic anion exchange resins such as Amberlyst No. 27 or Dowex 1-X8 are another example of a special class of basic catalysts which can successfully be used.

The amount of alkaline catalyst employed is within the range from about 0.01 to about 25% by weight of the hydroxy enol ester, preferably within the range from about 0.1 to about 1%.

Surprisingly, the amount of alkaline catalyst required for good yields is quite small. While large amounts are not deleterious in many cases (organic salts), they can be seriously detrimental in other cases (strong bases). It is therefore important to determine by trial-and-error experimentation in every case substantially the smallest amount of alkaline catalyst that is effective, and then use that amount and not more. This procedure is not only more economical but it also avoids any detrimental effect of a larger amount. Where not deleterious, however, quite large amounts of alkaline catalyst can be used, ranging up to about 25% in the case of alkali metal aliphatic acid salts. Illustrative optimum amounts for various alkaline catalysts are given in the Examples.

The lower aliphatic alcohol alcoholyzes the enol ester or diester, forming the ester of the lower aliphatic alcohol and the acid of the enol ester or diester, thus liberating hydroxy citronellal.

In the process of the invention, the lower aliphatic alcohol is essential, just as essential as the alkaline catalyst. The reaction in the presence of the alcohol achieves a catalytic alcoholysis, rather than a saponification. When the decomposition of the enol ester or diester is carried out in an essentially aqueous solution, the amount of alkali is not catalytic but stoichiometric, and the yields are low. The attacking anion in this case is the hydroxyl anion OH$^-$, and the freed acid is neutralized by the base, which is thus consumed in the process of decomposition. This process is a true saponification or alkaline hydrolysis.

In the base-catalyzed alcoholysis of the invention, the attacking anion is an alcoholate anion RO$^-$, and an ester, not an acid, is freed. Under the mild conditions of the process as described, the freed ester will not be decomposed further by base, and base will not be consumed. Moreover, the freed ester cannot be decomposed by RO$^-$, which is not a saponifying base. It could be saponified by HO$^-$ only if the reaction temperature were above the range stated, or if water were present, or if the concentration of HO$^-$ were sufficiently high.

It appears clearly that in saponification the base is a reactant, not a catalyst, whereas in alcoholysis or ester interchange, the alcohol is the reactant and the base is a catalyst.

The species HO$^-$ or RO$^-$ which are required for either saponification or alcoholysis are produced in situ by interaction of a base with the solvent (water or alcohol) namely by ionization of the base as in the case of strong hydroxylic bases or by abstraction of protons from the solvent in the case of some other bases. In the case where NaOH is dissolved in methanol, it is first ionized to HO$^-$, which further attacks the methanol to produce CH$_3$O$^-$. If water is then added, the concentration of CH$_3$O$^-$ will decrease and that of HO$^-$ will increase, reversibly. In the case where KOH is dissolved in tert-butyl alcohol, it is ionized to HO$^-$, but the hydroxyl anions are unable to abstract protons from tert-butyl alcohol and there is practically no tert-butyl anion formed. A solution of NaOH in methanol is therefore well suited to perform alcoholysis or ester interchange, whereas a solution of KOH in tert-butyl alcohol can only perform saponification. Consequently, a saponification can be performed in the absence of water. In the case of a solution of sodium acetate in methanol, saponification is impossible, since there is no way to produce HO$^-$. Proton abstraction from methanol is difficult, because of the weakness of the base, and very little CH$_3$O$^-$ will be formed. This is why high base concentration and high temperatures are required to perform an alcoholysis efficiently in the presence of alkali metal salts of organic acids.

The difficulties in obtaining a good yield of hydroxy citronellal by saponification (including alkaline hydrolysis) of the enol ester or diester are the consequence of the sensitivity of this aldehyde to alkaline pH. In order that the saponification takes place at a sufficient rate, whatever the base, weak or strong, a high alkaline pH, that is, a sufficient HO$^-$ concentration, is required, and this is detrimental to the freed aldehyde. It is not so with alcoholysis, which proceeds rapidly at a much lower pH. Example 21 clearly demonstrates this point. 50 mg. of NaOH in 100 ml. methanol do not raise the pH very much, yet this is enough base to quantitatively alcoholyze 25 g. of enol acetate of hydroxy citronellal in a matter of minutes at room temperature. Therefore, the alcoholate anions are much more efficient at catalysing the alcoholysis of the enol acetate than are hydroxy anions in saponifying it, and alcoholysis is a much better method of decomposition of the enol acetate than saponification. This is confirmed by Example 24. The concentration of CH$_3$O$^-$ in 20% aqueous methanol solution is certainly very small, compared to that of HO$^-$. However, the amount of methylacetate collected shows that the decomposition of the enol acetate in this medium proceeds largely via alcoholysis, the remainder by saponification. In cases where water is present, both reactions compete, and since base is consumed by saponification, it is necessary to replace it gradually to achieve a complete decomposition of the enol acetate.

Needless to say, the preferred conditions are those under which alcoholysis is favored over saponification, the best of all procedures being that using methanol and only a catalytic amount of base at room temperature. Yet water in small concentrations can be tolerated, so that there is no need to use dry reagents. The base, for instance, can conveniently be a concentrated aqueous solution of caustic soda.

Consequently, any lower aliphatic alcohol having up to five carbon atoms can be used, and illustrative of those that can be used are methanol, ethanol, propanol, isopropanol, butanol, isobutanol, and secondary butanol, pentanol and isopentanol. Methanol is preferred.

It is usually desirable that the alcohol comprise from about 2 to about 50 mole per mole enol ester or diester.

The reaction proceeds at low temperatures, and has a satisfactory rate at room temperature, at which temperature nearly 100% yields can be obtained. The reaction also will proceed at elevated temperatures, up to about 200°C. Elevated temperatures may be deleterious in some cases, however, so it is advisable by trial-and-error experimentation in each case to determine substantially the lowest temperature at which the reaction will proceed in good yield, so as to avoid a depressing effect of elevated temperature on yield, if there be one in that reaction system. Such an effect may be noted in the case of alkali metal hydroxides, for example, but alkaline salts of aliphatic acids are most effective at elevated temperatures. A convenient elevated temperature is the reflux temperature of the reaction mixture. Under reflux, the lower aliphatic alcohol ester can be removed as it is formed, in which event reaction is complete when no more lower aliphatic alcohol ester is found in the distillate.

The reaction is usually complete in from a few minutes up to about 24 hours.

The following Examples in the opinion of the inventors represent preferred embodiments of the invention.

EXAMPLES 1 TO 26

A series of hydrations of citronellal enol acetate, diacetate, and mixtures thereof was carried out, according to the following procedure:

In Examples 1 to 26, the citronellyl enol acetate, citronellyl diacetate, or mixtures thereof with up to 10% diacetate were added over a period of about 15 minutes to the aqueous sulfuric acid held at the reaction temperature indicated in the Tables I, II, III and IV below. The reaction mixture was then held at this temperature for the reaction time shown in these Tables, after which the reaction mixture was worked up, and the reaction product distilled.

Table I records examples of hydration of citronellyl enol acetate. In Example 8, the sulfuric acid solution was added to the enol acetate. The data show that yields of up to 92% of theory are obtainable. In all cases, about 2 to about 5% isopulegyl acetate was formed and a small amount of residue.

Tables II and III record examples of hydration of citronellyl diacetate and of mixtures of enol acetate and diacetate. The data show that both the diacetate and mixtures of diacetate and monoacetate react in good yield. Consequently, it is not necessary to separate these two compounds at the end of the esterification reaction.

Table IV records Examples 21 to 26, showing hydration of undistilled mixtures of enol acetate and diacetate as they are obtained from the acylation reaction after removal of excess acetic anhydride, using 56 to 74% sulfuric acid. The data show that from 60 to 70% sulfuric acid gives optimum yields, but good yields are also obtained at 74% up to 78% sulfuric acid and at less than 60% down to 58% sulfuric acid.

TABLE I

HYDRATION OF CITRONELLYL ENOL ACETATE

| Example No. | Amount of enol acetate (g.) | $H_2SO_4$ Concentration % | Weight Ratio to Enol Acetate | Temperature °C. | Time (hours) | Product Weight[1] (flashed) (g.) | Unreacted enol acetate (%) | Analysis Hydroxy enol acetate (%) | Residue (g.) | % Yield |
|---|---|---|---|---|---|---|---|---|---|---|
| 1 | 50 | 64 | 6 to 1 | -20 | 2 | 50 | 0 | 91 | 1.5 | 86 |
| 2 | 50 | 64 | 3 to 1 | -20 | 2 | 50.5 | 0 | 92 | 1.5 | 87.5 |
| 3 | 100 | 64 | 1.5 to 1 | -20 | 2 | 100.5 | 18 | 75 | 3 | 88 |
| 4 | 100 | 64 | 3 to 1 | -20 | 2 | 102 |  | 97 | 3 | 91 |
| 5 | 200 | 64 | 3 to 1 | -20 | 2 | 206 | 2 | 93 | 5 | 90 |
| 6 | 300 | 64 | 3 to 1 | -20 | 2 | 307 | 9.5 | 85.5 | 7.5 | 89 |
| 7 | 100[2] | 64 | 3 to 1 | -20 | 2 | 99.5 | 0 | 95 | 4.5 | 89 |
| 8 | 100[3] | 64 | 3 to 1 | -20 | 2 | 101.5 | 0 | 96 | 3.5 | 91 |
| 9 | 100 | 64 | 3 to 1 | -20 | 1 | 103 | 5.5 | 91 | 2 | 92 |
| 10 | 100 | 64 | 3 to 1 | -10 | 1/2 | 102.5 | 3 | 95 | 3 | 91 |
| 11 | 100 | 64 | 3 to 1 | 0 | 1/3 | 97 | 15 | 76 | 4 | 80 |
| 12 | 75 | 64 | 2 to 1 | -10 | 1 | 76.5 | 2.5 | 92.5 | 2.5 | 90 |
| 13 | 100 | 64 | 1.5 to 1 | -10 | 1 | 101 | 7.5 | 89 | 3.5 | 90 |
| 14 | 100 | 64 | 1.5 to 1 | 0 | 1/2 | 99.5 | 2% | 90 | 5 | 85 |

1. 2 to 5% isopulegyl acetate is formed during hydration in all cases.
2. Drowning into ice water. All other examples, quenching into soda ash solution.
3. $H_2SO_4$ added to enol acetate.

TABLE II

HYDRATION OF CITRONELLYL DIACETATE

| Example No. | Amount of diacetate (g.) | $H_2SO_4$ Concentration (%) | Weight Ratio to Diacetate | Temperature (°C.) | Time (Hours) | PRODUCT: Weight and Analysis Weight flashed (g.) | Unreacted diacetate (%) | Hydroxy diacetate (%) | Residue | % Yield |
|---|---|---|---|---|---|---|---|---|---|---|
| 15 | 100 | 64 | 3 to 1 | -20° | 2 | 94.5 | 5 | 88 | 3.5 | 81 |
| 16 | 75 | 64 | 2 to 1 | -10° | 1 | 69 | 47 | 47.5 | 2 | 72 |

TABLE III

HYDRATION OF MIXTURES OF ENOL ACETATE AND DIACETATE

| Example No. | Composition of mixture Enol Acetate (%) | Di Acetate (%) | Amount of mixture | $H_2SO_4$ Concentration (%) | Wet. Ratio to EnolAcetate Diacetate Mixture | Temperature (°C.) | Time (Hours) | PRODUCT: Weight and Analysis Weight flashed (g.) | Unreacted products (%) | Hydroxy compounds (%) | Residue (g.) | % Yield |
|---|---|---|---|---|---|---|---|---|---|---|---|---|
| 17 | 90 | 9 | 100 | 64 | 3 to 1 | -20° | 2 | 100 | enol 3 di 2.5 | 84 6 | 2.5 | 90 |
| 18 | 90 | 9 | 50 | 64 | 3 to 1 | -20° | 2 | 50 | enol ) 0 di ) | 89 7.5 | 2 | 90 |
| 19 | 90 | 10 | 100 | 64 | 3 to 1 | -20° | 1 | 102.5 | enol 7.5 di 1 | 81.5 7 | 2 | 94 |
| 20 | 90 | 10 | 100 | 64 | 3 to 1 | -20° | 2 | 99 | enol 11.5 di 4.2 | 76 0 | 3 | 85 |

TABLE IV

HYDRATION[1] OF UNDISTILLED MIXTURES[2] OF ENOL AND DIACETATE

| Example No. | Concentration of Sulfuric Acid % | Time of Reaction hr | Product Distillate g | Weight Residue g | Product Analysis (GLC) | | | | % Yield | |
|---|---|---|---|---|---|---|---|---|---|---|
| | | | | | % Unreacted | | % Hydroxy | | Direct | Based on used acetates |
| | | | | | Mono | Di | Mono | Di | | |
| 21 | 74 | 2 | 41 | 4 | 8 | 10 | 56.5 | 55 | 60 | 66 |
| 22 | 69 | 2 | 45.5 | 3 | 6.5 | 9 | 70.5 | 8.5 | 78 | 88 |
| 23 | 66 | 3 | 45 | 3 | 5.5 | 1 | 77 | 15.5 | 88 | 92 |
| 24 | 63 | 2 | 47 | 3.5 | 4 | 5 | 72 | 12.5 | 85 | 94 |
| 25 | 61 | 5 | 43 | 3.5 | 4.5 | 6 | 68 | 13 | 76 | 84 |
| 26 | 56 | 4 | 46 | 1.5 | 45 | 14 | 6.5 | 5 | Mostly unreacted enol acetate besides 27% Isopulegyl acetate | |

[1] All experiments conducted at -20 - 25°C., using 50g of mixture and 300g of acid.

[2] Analysis of the undistilled mixtures: 71% mono acetate, 16.5% diacetate, 3% polymeric material, 10% low boiling material, including isopulegyl acetate.

EXAMPLE 27

Hydration of Citronellyl Enol Acetate in a Continuous Manner.

The reactor was a circular tube in a closed loop about 8 feet long and 200 cc. in volume, with injection ports for the sulfuric acid and the enol acetate, mixing chamber with a gear pump and over-flow port for removal of the reaction mixture. The reactor was internally and externally cooled by a circulating cooling mixture. The pump was operated at 400 r.p.m. and the speed of recirculation of the mixture in the reactor was 65 cm/sec. The residence time averaged from 6 seconds to about 6 minutes; the reaction temperature was 18°C; the concentration of sulfuric acid 69%, weight ratio sulfuric acid to enol acetate 1.35 to 1.0. The unreacted enol acetate was 20%, which could be recycled. The yield based on reacted enol acetate was 75%, 60% based on enol acetate charged to the reactor.

The hydroxy enol acetates and diacetates of citronellal prepared by the above Examples 1 to 27 were then alcoholyzed to form hydroxy citronellal. A two liter round-bottom reaction flask equipped with a stirrer and a seven plate Goodloe column topped with a variable reflux head were used. The charge to the reaction vessel in each run was 250 g. of the hydroxy citronellyl enol acetate, diacetate, or mixture, redistilled, 750 g. methanol and 10 g. sodium acetate. The reaction was carried out at 67° to 68.6°C. for a total of six hours. The take-off from the column was set at a 1:10 reflux ratio for the first 2 hours of the reaction, and then changed to a 20:1 reflux ratio for the next hour, and to a 40:1 reflux ratio for the next 3 hours, after which reaction was complete, and the remaining methyl alcohol was distilled off under slight vacuum.

After the methyl alcohol had been distilled off, the catalyst precipitated. This was separated by dissolution in 50 cc. of water. The oil was then washed with two 50 cc. portions of water, and the combined aqueous layer and washes were extracted with two 50 cc. portions of isopropyl ether. After the solvent had been removed, the crude oil was flash-distilled. The boiling point of the product was 90°C. at 2 mm., the refractive index $N_d^{20}$ =1.4492, and the yield was 97% of theory.

Similar results were obtained with potassium acetate.

EXAMPLES 28 to 46

Following the procedure of Examples 1 to 20, a quantity of mixed hydroxy citronellal enol acetates and diacetates was prepared. This was separated into portions, which were each alcoholyzed in the presence of the alkaline catalysts and under the conditions shown in Table V.

TABLE V

| Example No. | Weight of HEA (g.) | Base | | | Alcohol Solvent | Temp. °C. | Time (hours) | DISTILLATION: | | Product Analysis by GLC | | | (%) Yield |
|---|---|---|---|---|---|---|---|---|---|---|---|---|---|
| | | Nature | Weight (mg.) | % by Weight based on HEA | | | | Distillate (g.) | Residue (g.) | L.B. | H.C. | HEA | |
| | | Alkali Metal Hydroxides | | | | | | | | | | | |
| 28 | 25 | NaOH | 50 | 0.2 | Dry MeOH | 25° | 1/6 | 20 | - | 0.5 | 99 | 0.5 | 99 |
| 29 | 25 | NaOH | 125 | 0.5 | Dry MeOH | 25° | 6 1/2 | 19.5 | 0.5 | - | 99.8 | - | 97.5 |
| 30 | 25 | NaOH | 250 | 1 | Dry MeOH | 25° | 6 | 13 | 7 | - | 99.7 | - | 65 |
| 31 | 25 | NaOH | (2.4 g as 20% aqueous solution) | 10 | 20% aqueous methanol | 25° | 7 | 17.5 | 2.5 | - | 98.5 | - | 86 |
| 32 | 25 | NaOH | 200 | 0.8 | Dry isopropanol | 25° | 1 | 13.5 | 7.5 | - | 88.5 | 6 | 60 |
| 33 | 25 | NaOH | 50 | 0.2 | Dry MeOH | Reflux | 5 | 20 | - | 0.7 | 99 | 0.2 | 99 |
| 34 | 25 | NaOH | 100 | 0.4 | Dry MeOH | Reflux | 1 1/2 | 13 | 7 | 0.5 | 99.5 | - | 65 |
| Control A | 25 | NaOH | 100 | 0.4 | None | 75° | 1 1/2 | - | - | - | - | - | trace |
| Control B | 25 | NaOH | 100 | 0.4 | H₂O | Reflux | 1 1/2 | - | - | - | - | - | trace |

TABLE V - continued

| Example No. | Weight of HEA (g.) | Base Nature | Weight (mg.) | % by Weight based on HEA | Alcohol Solvent | Temp. °C. | Time (hours) | DISTILLATION: Distillate (g.) | Residue (g.) | Product Analysis by GLC L.B. | H.C. | HEA | % Yield |
|---|---|---|---|---|---|---|---|---|---|---|---|---|---|
| | | Alkali Metal Alcoholate and Phenolate | | | | | | | | | | | |
| 35 | 25 | NaOCH$_3$ | 100 | 0.4 | Dry MeOH | Reflux | 5 | 19.5 | 0.5 | 1 | 99 | - | 97 |
| 36 | 25 | Sodium phenate | 250 | 1 | Dry MeOH | Reflux | 1 1/2 | 16 | 4 | 3 | 97 | - | 77 |
| | | Alkali Metal Carbonates and Bicarbonates | | | | | | | | | | | |
| 37 | 25 | K$_2$CO$_3$ | 50 | 0.2 | Dry MeOH | Reflux | 2 | 20 | - | 0.5 | 99 | 0.5 | 99 |
| 38 | 25 | K$_2$CO$_3$ | 100 | 0.4 | Dry MeOH | Reflux | 1 1/2 | 19 | 1 | - | 99.8 | - | 96 |
| 39 | 25 | K$_2$CO$_3$ | 150 | 0.6 | Dry MeOH | Reflux | 2 | 16.5 | 3.5 | - | 99.8 | - | 82.5 |
| 40 | 25 | Na$_2$CO$_3$ | 250 | 1 | Dry MeOH | Reflux | 3 | 11 | 9 | 1 | 97.5 | 1.5 | 55 |
| 41 | 25 | NaHCO$_3$ | 250 | 1 | Dry MeOH | Reflux | 2 | 15.5 | 4 | 1.5 | 98.5 | - | 77 |
| Control C | 25 | K$_2$CO$_3$ | 50 | 1 | None | 75° | 2 | - | - | - | - | - | 0 |
| Control D | 25 | K$_2$CO$_3$ | 50 | 1 | H$_2$O | Reflux | 2 | - | - | - | - | - | Trace |
| | | Alkali Metal Salts of Organic Acids | | | | | | | | | | | |
| 42 | 250 | Potassium acetate | 10 | 4 | Dry MeOH | Reflux | 8 | 197 | 2.5 | 1.5 | 98 | - | 96 |
| 43 | 25 | Sodium acetate | 1 | 4 | Dry MeOH | Reflux | 8 | 19.5 | 0.5 | 2 | 98 | - | 97 |
| 44 | 50 | Sodium acetate | 5 | 10 | Dry MeOH | Reflux | 4 | 39 | 0.5 | - | 95 | 2.5 | 96 |
| 45 | 250 | Sodium acetate | 10 | 4 | Dry MeOH | Reflux | 6 | 197 | 2.5 | 1.5 | 98.5 | - | 97 |
| 46 | 25 | Sodium acetate | 1 | 4 | Dry MeOH | Reflux | 9 | 19.5 | 0.5 | - | 98 | - | 97 |
| Control E | | Potassium acetate | 10 | 4 | None | 75° | 9 | - | - | - | - | - | 0 |
| Control F | | " " | " | " | H$_2$O | Reflux | 9 | - | - | - | - | - | trace |

A comparison of Examples 29 and 33 shows that at small amount of alkali temperature is not critical, while Example 34 shows that at higher amounts of alkali it is important to use low temperatures. Controls A and B show the importance of the methanol to the yield. Examples 30 to 32 give good yields, but clearly small amounts of alkali are better.

Examples 35 and 36 illustrate alcoholates and phenates as the base.

Examples 37 to 39 show that potassium carbonate is equally effective. Example 40 shows that sodium carbonate is effective but clearly less than 1% would give a better yield, as in the case of Examples 37 to 39. Sodium bicarbonate is intermediate (Example 41). Controls C and D show the importance of the methanol to the yield.

The alkali metal salts of organic acids (Examples 42 to 46) are effective at high amounts at elevated temperatures. Controls E and F show the importance of the methanol to the yield.

EXAMPLE 47

One milliliter of 5% sodium or potassium hydroxide in methanol was added to a mixture of 25 g. hydroxy citronellyl enol acetate in 100 ml. of methanol under agitation at room temperature. The exothermic reaction was completed in 5 minutes. After removal of the methyl acetate and methanol, the yield of hydroxy citronellal was found to be quantitative. The amount of caustic here is 0.2% by weight of the hydroxy citronellal. Higher amounts of caustic are not needed, but will not be damaging if reaction time is short, at room temperature. When for instance 0.4% of NaOH is used under the above-described conditions and stirring is maintained for six hours, the yield was still very good, i.e., about 97.5%. However, when the amount of NaOH was increased to 1%, with reaction at room temperature for 6 hours, the yield was reduced to 65%.

If the reaction is done at reflux temperature, the use of 0.4% NaOH results in a 65% yield in 2 hours' reaction time.

EXAMPLE 48

The reaction can be also done in a mixture of alcohol and water at room temperature. Under these conditions, however, more alkali is needed. 25 g. of hydroxy enol acetate was dissolved in 200 ml. of 80% methanol in water, and 12g. of 20% aqueous NaOH solution was added slowly within 7 hours with stirring at room temperature. The amount of NaOH here is about 9.6% by weight of the hydroxy enol acetate. The yield was 88%.

Having regard to the foregoing disclosure, the following is claimed as the inventive and patentable embodiments thereof:

1. In the process for the preparation of hydroxy citronellal from citronellal, the improvement which comprises preparing an enol ester or diester or mixture thereof of citronellal by reaction with a lower alkanoic acid anhydride in the presence of an alkali metal lower alkanoic acid salt; hydrating the resulting enol ester or diester or mixture thereof in the presence of aqueous sulfuric acid having a sulfuric acid concentration within the range from about 58 to 78% at a temperature within the range from about −20° to about 50°C; and then alcoholizing the hydroxy enol ester or diester to form hydroxy citronellal in the presence of a lower alkanol and a base selected from the group consisting of alkali metal and alkaline earth metal hydroxides, carbonates and bicarbonates, and alkali metal and alkaline earth metal salts of alkane, alkene, cycloalkane, and aryl carboxylic acids, alcohols, mercaptans, phenols, and basic anion exchange resins, in an amount within the range from about 0.01 to about 25% by weight of the hydroxy enol ester.

2. A process in accordance with claim 1, in which the amount of sulfuric acid solution in the hydration reaction is within the range from about 1 to about 6 parts per part of enol ester.

3. A process in accordance with claim 1, in which the hydration reaction time is within the range from a few seconds to about 2 hours.

4. A process in accordance with claim 1, in which the ester and aqueous sulfuric acid are blended continuously, and continuously passed through a reaction zone to effect the hydration.

5. A process in accordance with claim 1, in which the base is an alkali metal organic acid salt.

6. A process in accordance with claim 5, in which the alkali metal organic acid salt is potassium acetate.

7. A process in accordance with claim 5, in which the alkali metal organic acid salt is sodium acetate.

8. A process in accordance with claim 1, in which the base is an alkali metal or alkaline earth metal hydroxide.

9. A process in accordance with claim 8, in which the alkali metal hydroxide is sodium hydroxide.

10. A process in accordance with claim 1, in which the base is an alkali metal or alkaline earth metal carbonate.

11. A process in accordance with claim 10, in which the alkali metal carbonate is potassium carbonate.

12. A process in accordance with claim 10, in which the alkali metal carbonate is sodium bicarbonate.

13. A process in accordance with claim 1, in which the base is an alkali metal or alkaline earth metal alcoholate.

14. A process in accordance with claim 13, in which the alkali metal alcoholate is sodium methylate.

15. A process in accordance with claim 1, in which the base is an alkali metal or alkaline earth metal phenate.

16. A process in accordance with claim 1, in which the alcoholysis reaction is carried out at a temperature within the range from ambient temperature to the reflux temperature of the reaction mixture.

17. A process in accordance with claim 1, in which the base in the alcoholysis reaction is in a yield-enhancing amount within the range from about 0.1 to about 1% by weight of the ester.

18. A process in accordance with claim 1, in which the lower aliphatic acid anhydride is acetic anhydride.

19. A process for the hydration of an enol ester or diester or mixture thereof of citronellal and a lower aliphatic acid anhydride, which comprises reacting the enol ester or diester or mixture thereof at a temperature within the range from about −20° to about 50°C. in the presence of aqueous sulfuric acid having a sulfuric acid concentration within the range from about 58 to about 78% until a hydroxy enol ester, diester or mixture thereof is formed.

20. A process in accordance with claim 19, in which the amount of sulfuric acid solution is within the range from about 1 to about 6 parts per part of enol ester.

21. A process in accordance with claim 19, in which the ester and aqueous sulfuric acid are blended continuously, and continuously passed through a reaction zone to effect the hydration.

22. A process for the alcoholysis of a citronellyl hydroxy lower alkanoic acid enol ester, diester, or mixture thereof, which comprises reacting the hydroxy enol ester, diester or mixture thereof at a temperature within the range from ambient temperature to the reflux temperature of the reaction mixture in the presence of a base selected from the group consisting of alkali metal and alkaline earth metal hydroxides, carbonates and bicarbonates, and alkali metal and alkaline earth metal salts of alkane, alkene, cycloalkane, and aryl carboxylic acids, alcohols, mercaptans, phenols and basic anion exchange resins, in a yield-enhancing amount within the range from about 0.01 to about 25% by weight of the ester and in the presence of a lower alkanol until hydroxy citronellal is formed.

23. A process in accordance with claim 22, in which the reaction is carried out under reflux of the reaction mixture.

24. A process in accordance with claim 22, in which the base is an alkali metal or alkaline earth metal lower aliphatic acid salt.

25. A process in accordance with claim 22, in which the base is an alkali metal or alkaline earth metal hydroxide.

26. A process according to claim 22, in which the base is an alkali metal or alkaline earth metal carbonate.

27. A process in accordance with claim 22, in which the amount of base is within the range from about 0.1 to about 1% by weight of the ester.

28. A process for the preparation of hydroxy citronellal from a citronellyl-lower alkanoic acid anhydride enol ester, diester, or mixture thereof, which comprises reacting the enol ester, diester, or mixture thereof at a temperature within the range from about −20° to about 50°C in the presence of aqueous sulfuric acid having a sulfuric acid concentration with the range from about 58 to about 78% until a hydroxy ester is formed; and then reacting the hydroxy ester in the presence of a lower alkanol and a base selected from the group consisting of alkali metal and alkaline earth metal hydroxides, carbonates and bicarbonates, and alkali metal and alkaline earth metal salts of alkane, alkene, cycloalkane, and aryl carboxylic acids, alcohols, mercaptans, phenols and basic anion exchange resins, in an amount within the range from about 0.01 to about 25% by weight of the hydroxy enol ester until hydroxy citronellal is formed.

29. A process in accordance with claim 28, in which the amount of sulfuric acid solution is within the range from about 1 to about 6 parts per part of enol ester.

30. A process in accordance with claim 28, in which the reaction is carried out at a temperature within the range from ambient temperature to the reflux temperature of the reaction mixture.

31. A process in accordance with claim 28, in which the base is an alkali metal or alkaline earth metal hydroxide.

32. A process in accordance with claim 28, in which the base is an alkali metal lower aliphatic acid salt.

33. A process in accordance with claim 28, in which the base is an alkali metal or alkaline earth metal carbonate.

34. A process in accordance with claim 28, in which the ester and aqueous sulfuric acid are blended continuously, and are continuously passed through a reaction zone to effect the hydration.

* * * * *